United States Patent
Agrawal et al.

(10) Patent No.: US 12,272,142 B2
(45) Date of Patent: Apr. 8, 2025

(54) MONITORING SYSTEM WITH IMAGE PROJECTION OF CONTENT OF SUBJECTIVE INTEREST TO A PERSON

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 451 days.

(21) Appl. No.: 17/708,934

(22) Filed: Mar. 30, 2022

(65) Prior Publication Data

US 2023/0316759 A1 Oct. 5, 2023

(51) Int. Cl.
*G06V 20/52* (2022.01)
*G06F 3/01* (2006.01)
*G06V 10/25* (2022.01)
*G06V 40/16* (2022.01)

(52) U.S. Cl.
CPC .............. *G06V 20/52* (2022.01); *G06F 3/013* (2013.01); *G06V 10/25* (2022.01); *G06V 40/176* (2022.01)

(58) Field of Classification Search
CPC ...... G06V 20/52; G06V 10/25; G06V 40/176; G06F 3/013; G06F 3/012; G06F 3/017

USPC ......................................................... 382/103
See application file for complete search history.

(56) References Cited

U.S. PATENT DOCUMENTS

2017/0047096 A1* 2/2017 Li .......................... G11B 27/34

FOREIGN PATENT DOCUMENTS

| DE | 102019218410 | * 11/2019 | ........... B60R 16/037 |
| JP | 2009237996 | * 1/2013 | |
| TW | 202107333 | * 2/2021 | |

* cited by examiner

*Primary Examiner* — Jerome Grant, II
(74) *Attorney, Agent, or Firm* — Isidore PLLC

(57) ABSTRACT

A monitoring system incorporates, and a method and a computer program product provide image projection of content of subjective interest to a person, responsive to a detected mood of the person. A controller of the monitoring system receives image stream(s) from a camera system, including a first image stream encompassing a face of a person. The controller compares facial expressions within the first image stream with facial expression trigger(s) in a visual object library. In response to determining that the first image stream includes facial expression trigger(s) among the visual object library, the controller determines one or more objects in the visual object library having an associated interest value, in a preference tracking data structure, above a threshold soothing value corresponding to the person. The controller triggers an image projector to present the object(s) within the field of view of the person to respond to the facial expression trigger.

20 Claims, 9 Drawing Sheets

MONITORING SYSTEM WITH IMAGE PROJECTION OF CONTENT OF SUBJECTIVE INTEREST TO A PERSON

BACKGROUND

1. Technical Field

The present disclosure relates generally to camera-based monitoring systems that can monitor a person of interest, and more particular to camera-based monitoring systems that detect eye gaze direction of the person.

2. Description of the Related Art

Certain people who are unable to take care of themselves, such as infants, the sick, and those with ambulatory and communication deficits, require regular attention for their safety and/or well-being. A caregiver, such as a parent for an infant, who is responsible for the person is often removed from the person and rely on monitoring systems that allow the caregiver to attend to other activities while being mindful of the person being monitored and/or cared for. The monitoring systems detect at least audio and in some instances video, which are conveyed to the remote caregiver. Although use of the monitoring system allows the caregiver to move away from the cared for person, the monitoring system does not serve the needs of the cared for person nor does the monitoring system handle determining when such service is required. The caregiver has to continually assess the state of the cared-for person by paying attention to the output being locally provided of the audio and/or video captured by the remote monitoring system. If attending to other activities, the caregiver cannot scrutinize the video to understand the nuances of the state of the cared-for person, and the received output does not provide information about objects of interest to and/or objects and images viewable by the cared-for person.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
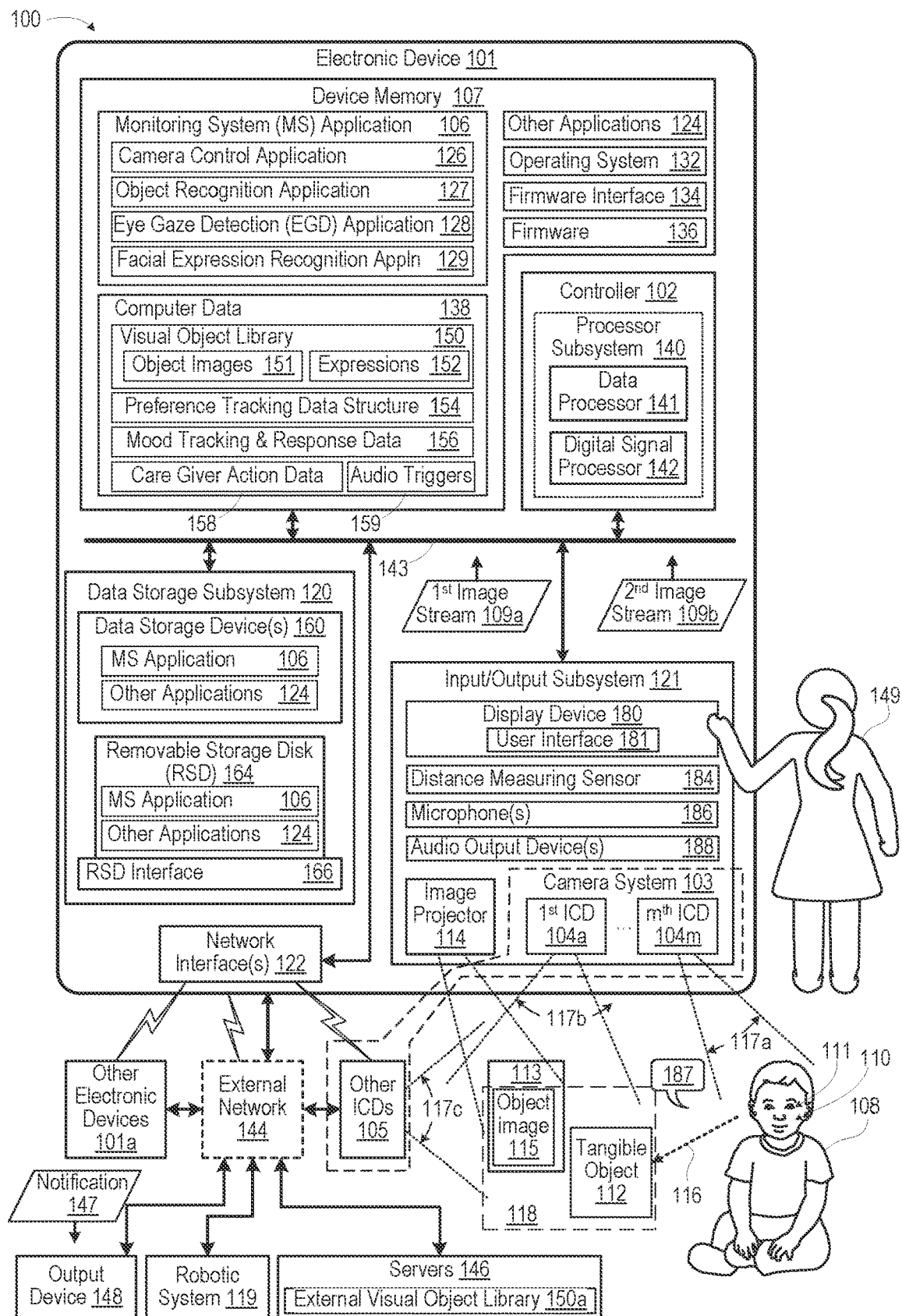
FIG. 1 depicts a functional block diagram of a monitoring system having an electronic device that detects eye-gaze direction of a person and learns about and responds to objects of subjective interest to the person, in part based on eye-gaze direction and duration, according to one or more embodiments.

According to a first aspect of the present disclosure, a monitoring system incorporates a method and a computer program product that provide image projection of content of subjective interest to a person responsive to a detected mood of the person. The monitoring system has a camera system including at least one image capturing device. The camera system captures a first image stream portion that encompasses a face of a first person of interest. The monitoring system includes an image projector. A memory of the monitoring system stores: (i) a visual object library; and (ii) a preference tracking data structure. A controller of the monitoring system is communicatively coupled to at least one microphone, the image projector, and the memory. The controller compares a facial expression within the first image stream portion with one or more facial expression triggers in the visual object library. In response to determining that the first image stream portion comprises at least one facial expression that is pre-established as a facial expression trigger within the visual object library, the controller determines and selects, from visual object library, one or more object images that is/are linked to the at least one facial expression for presentation to the person in response to detecting the at least one facial expression within the first image stream portion. The selected one or more objects are objects that have an interest value within the preference tracking data structure that is above a threshold interest value that corresponds to the first person. The controller triggers the image projector to present the one or more objects within the field of view of the first person to respond to the facial expression trigger and/or to generate a response of a different desired facial expression or mood from the person.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an example of monitoring system 100 that includes at least one electronic device 101 in an operating environment within which the features of the present disclosure are advantageously implemented. In particular, controller 102 of electronic device 101 is communicatively coupled to camera system 103 having one or more image capturing devices (ICDs) 104a-104m. Camera system 103 can also include other detached ICDs 105 that are external to electronic device 101. Controller executes monitoring system application 106 in device memory 107 to configure electronic device 101 as monitoring system 100 for first person 108 of interest, such as an infant, a small child, or an adult with ambulatory and communication deficits. Camera system 103 captures first image stream 109a that encompasses face 110 including eyes 111 of first person 108 of interest and second image stream 109b that at least partially encompasses one or more surrounding tangible objects 118 and surfaces 113 viewable by first person 108. Image projector 114 of electronic device 101 (or provided as a second device of monitoring system) may project object images 115 on surfaces 113 that are within the field of view of (i.e., visible to) first person 108. First person 108 demonstrates interest in tangible objects 118 and/or object images 115 at least in part by the person's eye gaze direction 116. In one or more embodiments, camera system 103 includes more than one ICD 104a-104m and/or detached ICDs 105 and thus is a multi-camera camera system. In an example, $m^{th}$ ICD 104m has a first field of view (FOV) 117a configured to encompass first image stream 109a. First ICD 104a has second FOV 117b configured to encompass second image stream 109b.

According to aspects of the present disclosure, controller 102 determines locations of both tangible objects 118 and object images 115 on surface 113 that have a respective physical location and that are visible to first person 108. For simplicity, tangible objects 118 and object images 115 are collectively referred to as objects 115/118. Controller 102 monitors eye gaze direction 116 of first person 108 to detect interest and disinterest in each object 115/118, whether tangible object 112 or object image 115. In one or more embodiments, such as during the process of learning interests of first person 108, controller 102 may only monitor eye gaze direction 116 with regard to tangible objects 118. In one or more embodiments, controller 102 may project all object images 115 of interest to first person 108. Although similarly analyzed for subject interest, controller 102 treats tangible objects 118 and object images 115 differently in other embodiments of the present disclosure. For example, controller 102 may periodically scan for tangible objects 118 that may be manually positioned within view of first person 108. In one or more embodiments, controller 102 is communicatively coupled to robotic systems 119 that manipulate tangible objects 118 for purposes such as moving tangible objects 118 into view of first person 108 or positioning tangible objects 118 for use by first person 108 responsive to detected interest. Controller 102 may perform other activities for object images 115. Controller 102 scans for portions of surfaces 113 that are unobstructed and smooth as candidate regions for receiving a projection of particular object images 115.

In one or more embodiments, camera system 103 may include a single ICD and thus be a single camera system rather than a multi-camera system (e.g., including two ICDs 104a-104b that are integral to electronic device 101). In an example, one detached or stand-alone ICD 105 has third FOV 117c configurable to encompass both first image stream 109a and second image stream 109b, simultaneously viewing face 110 and eyes 111 of person 108 as well as objects 118 such as tangible object 112 and/or object image 115. In another example, detached ICD 105 has configurable third FOV 117c configurable in a first direction to encompass first image stream 109a and in a second direction to encompass second image stream 109b, alternating between viewing face 110 and eyes 111 of person 108 and then object 118 located in eye gaze direction 116 of person 108. In one or more embodiments, the ability to configure detached ICD 105 can be enabled with use of a gimbal that enables rotation of the camera lens between at least the first direction and second direction corresponding to first image stream 109a and second image stream 109b.

Electronic device 101 can be one of a host of different types of devices, including but not limited to, an infant monitoring system, a mobile cellular phone, satellite phone, or smart-phone, a laptop, a net-book, an ultra-book, a networked smart watch, networked sports/exercise watch, and/or a tablet computing device or similar device. As more completed presented within communication device 200 of FIG. 2, described hereafter, electronic device 101 can also be a device supporting wireless communication. In these implementations, electronic device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Most importantly, it is appreciated that the features described herein can be implemented with a display device of various other types of electronic devices that are not necessarily a communication device. The specific presentation or description herein of a mobile communication device in addition to a data processing system as different examples of electronic device 101 are for example only, and not intended to be limiting on the disclosure.

Referring now to the specific component makeup and the associated functionality of the presented components. In one or more embodiments, in addition to device memory 107, electronic device 101 includes data storage subsystem 120, input/output (I/O) subsystem 121, and network interface 122, each of which is managed by controller 102. Device memory 107 includes program code for applications, such as monitoring system application 106 and other applications 124. In one or more embodiments, monitoring system application 106 is a suite of applications, utilities, components, or modules that configure electronic device 101 to monitor first person 108. In an example, monitoring system application 106 includes camera control application 126, object recognition application 127, eye gaze detection application 128, and facial expression recognition application 129. Device memory 107 further includes operating system (OS) 132, firmware interface 134, such as basic input/output system (BIOS) or Uniform Extensible Firmware Interface (UEFI), and firmware 136. Device memory 107 stores computer data 138 that is used by monitoring system application 106.

Controller 102 includes processor subsystem 140, which executes program code to provide operating functionality of electronic device 101. Controller 102 manages, and in some instances directly controls, the various functions and/or operations of electronic device 101. These functions and/or operations include, but are not limited to including, application data processing, communication with second communication devices, navigation tasks, image processing, and signal processing. In one or more alternate embodiments, electronic device 101 may use hardware component equivalents for application data processing and signal processing. For example, electronic device 101 may use special purpose hardware, dedicated processors, general purpose computers, microprocessor-based computers, micro-controllers, optical computers, analog computers, dedicated processors and/or dedicated hard-wired logic.

The software and/or firmware modules executed by processor subsystem 140 have varying functionality when their corresponding program code is executed by data processor(s) 141 or secondary processing devices within electronic device 101 such as digital signal processor 142. Processor subsystem 140 can include other processors that are communicatively coupled internally or externally to data processor 141. Data processor 141 is communicatively coupled, via system interlink 143, to device memory 107, data storage subsystem 120, and network interface 122. System interlink 143 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 143) are illustrated in FIG. 1, it is to be understood that more, fewer, or different interconnections may be present in other embodiments.

Network interface 122 enables electronic device 101 to connect (via wireless or wired connection) to external network 144 and directly/indirectly to other devices such as robotic systems 119. Network 144 provides connection to and can include one or more network servers 146 and can provide connection to other devices such as robotic systems 119. Electronic device 101 is thus able to connect with servers 146 and other devices such as robotic systems 119 to share and/or download application data that can be utilized to implement features of the disclosure. In an example, servers 146 may contain external visual object library 150a. Monitoring system 100 may include more than one electronic devices 101 that are communicatively coupled to cooperate in independently monitoring separate portions of a room or a different room. Electronic device 101 may communicate notifications 147 to output device 148 used by second person 149. In a broader application, the term "second person" 149 may refer to a human being, a robot, a support machine, or a customer service dispatch system, in different embodiments. In one or more embodiments, network interface 122 of communication device 200 includes a network connection such as an Ethernet receptacle that connected by a network cable to a wired area network. Network interface 122 can support one or more network communication protocols such as a local area network (LAN), a campus area network (CAN), a metropolitan area network (MAN), or a wide area network (WAN).

Processor subsystem 140 of controller 102 can execute program code of monitoring system application 106 to configure electronic device 101 to perform specific functions that use or create computer data 138. In an example, computer data 138 includes visual object library 150 having stored object images 151 and facial expressions 152. Computer data 138 also may include preference tracking data structure 154, mood tracking and response (MTR) data structure 156, caregiver action data 158, and audio trigger data 159. These various data are referenced and updated by monitoring system application 106.

Data storage subsystem 120 of electronic device 101 includes data storage device(s) 160. Controller 102 is communicatively connected, via system interlink 143, to data storage device(s) 160. Data storage subsystem 120 provides applications, program code, and stored data on nonvolatile storage that is accessible by controller 102. For example, data storage subsystem 120 can provide a selection of applications and computer data, such as monitoring system application 106 and other application(s) 124. These applications can be loaded into device memory 107 for execution by controller 102. In one or more embodiments, data storage device(s) 160 can include hard disk drives (HDDs), optical disk drives, and/or solid-state drives (SSDs), etc. Data storage subsystem 120 of electronic device 101 can include removable storage device(s) (RSD(s)) 164, which is received in RSD interface 166. Controller 102 is communicatively connected to RSD 164, via system interlink 143 and RSD interface 166. In one or more embodiments, RSD 164 is a non-transitory computer program product or computer readable storage device. Controller 102 can access RSD 164 or data storage device(s) 160 to provision electronic device 101 with program code, such as code for monitoring system application 106 and other application(s) 124, and with computer data 138 such as visual object library 150.

In addition to ICDs 104a-104m and image projector 114, I/O subsystem 121 includes display device 180 that presents user interface 181 for use by second person 149 when in the room with monitoring system 100. Second person 149 may also remotely control or view output from monitoring system 100 via output device 148. In one or more embodiments, ICDs 104a-104m provide three-dimensional data or are augmented by distance measuring sensor 184 to assist in determining relative locations of first person 108, objects 118 and surfaces 113. Controller 102 can then use eye gaze direction 116 of first person 108 to identify regions of interest (ROI) to first person 108. I/O subsystem 121 includes microphone(s) 186 that can be used to receive audio input 187 from first person 108, such as sounds of crying, giggling, laughing, and talking, which, in addition to or in conjunction with facial expressions, indicate a mood of first person 108. I/O subsystem 121 includes audio output device(s) 188 that may produce soothing sounds or communication from other devices, such as robotic systems 119.

In an aspect of the present disclosure, electronic device 101 includes camera system 103, which has at least one image capturing device (103a-104m, 105) and which captures first image stream 109a that encompasses face 110 of first person 108 of interest. Electronic device 101 includes or is communicatively coupled to image projector 114. Device memory 107 stores: (i) visual object library 150; and (ii) preference tracking data structure 154. Controller 102 is communicatively coupled to memory 107 and image projector 114. Controller 102 compares detected facial expressions within first image stream 109a with one or more facial expression triggers in visual object library 150. In response to determining that first image stream includes at least one facial expression that is a pre-established facial expression trigger within visual object library 150, Controller 102 determines one or more object images 115 in visual object library 150 having an interest value in preference tracking data structure 154 above a threshold interest value corresponding to first person 108. Controller 102 responds to the trigger by triggering image projector 114 to present the one or more of the object images 115, which are above the threshold interest value, within the field of view of first person 108. Controller 102 triggers the presenting of the object images 115 to generate a response of a different desired facial expression or mood from person 108. In an example, the facial expression trigger indicates boredom. Object images 115 are selected to engage person 108. In an example, the facial expression trigger indicates being upset. Object images 115 are selected to distract and soothe person 108.

Figure 2:
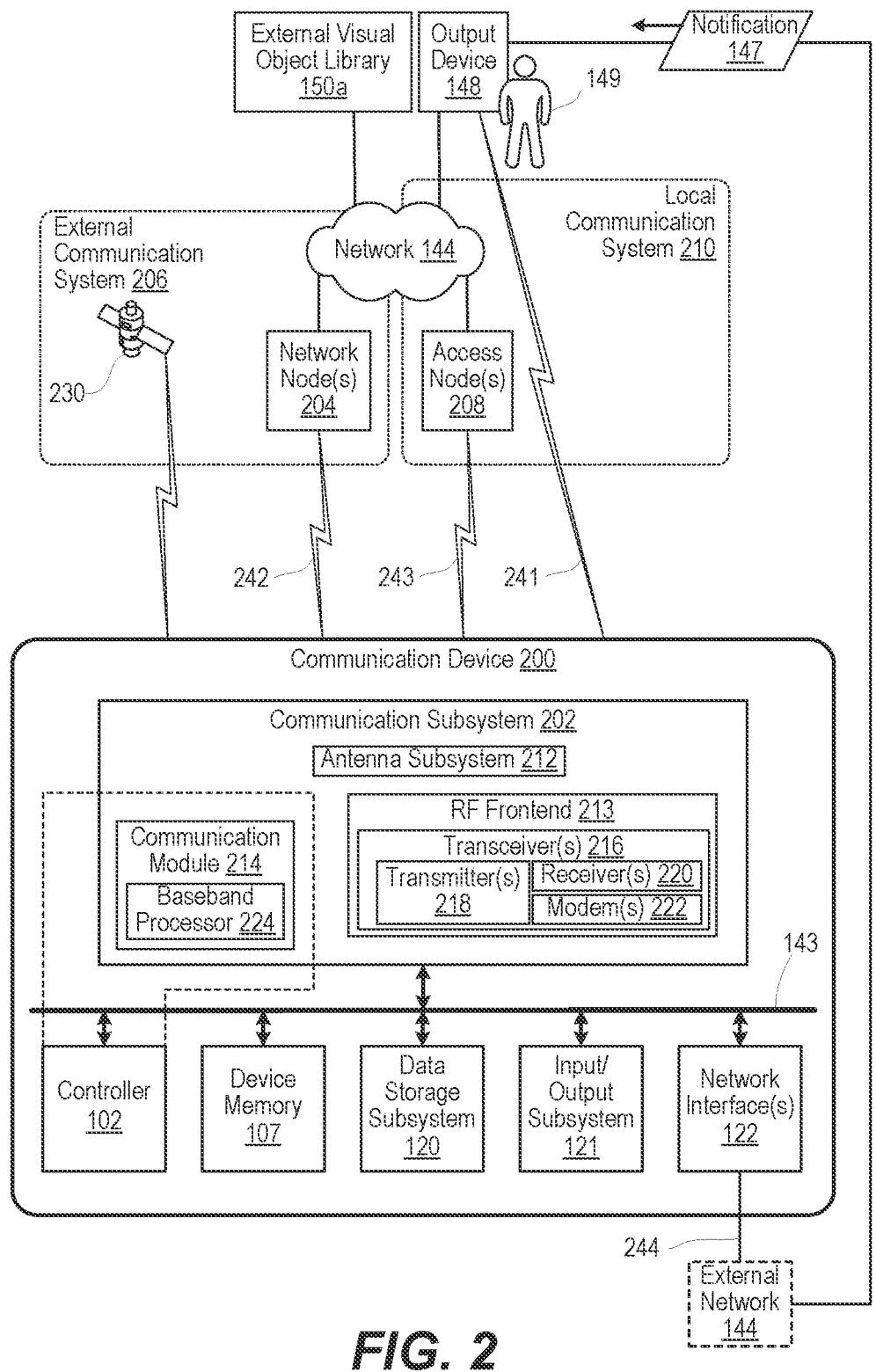
FIG. 2 depicts a functional block diagram of a monitoring system having a communication device that performs learning and notification functions based on detected eye-gaze direction of a person in an operating environment within which the features of the present disclosure are advantageously implemented, according to one or more embodiments.

FIG. 2 is a functional block diagram of communication device 200 in an operating environment within which the features of the present disclosure are advantageously implemented. Communication device 200 is an implementation of electronic device 101 (FIG. 1), including controller 102, device memory 107, data storage subsystem 120, I/O subsystem 121, and network interface(s) 122. Communication device 200 further includes communication subsystem 202 for communicating, using a cellular connection, with network node(s) 204 of external communication system 206 and for communicating, using a wireless connection, with access node(s) 208 of local communication system 210. Communication subsystem 202 includes antenna subsystem 212. Communication subsystem 202 includes radio frequency (RF) front end 213 and communication module 214. RF front end 213 includes transceiver(s) 216, which includes transmitter(s) 218 and receiver(s) 220. RF front end 213 further includes modem(s) 222. Communication module 214 of communication subsystem 202 includes baseband processor 224 that communicates with controller 102 and RF front end 213. Baseband processor 224 operates in a baseband frequency range to encode data for transmission and decode received data, according to a communication protocol. Modem(s) 222 modulate baseband encoded data from communication module 214 onto a carrier signal to provide a transmit signal that is amplified by transmitter(s) 218. Modem(s) 222 demodulates each signal received from external communication subsystem 202 using by antenna subsystem 212. The received signal is amplified and filtered by receiver(s) 220, which demodulate received encoded data from a received carrier signal.

In one or more embodiments, controller 102, via communication subsystem 202, performs multiple types of cellular OTA or wireless communication with local communication system 210. Communication subsystem 202 can communicate via an over-the-air (OTA) connection 241 with output device 148 used by second person 149 ("caregiver"). In an example, OTA connection 241 is a peer-to-peer connection, Bluetooth connection, or other personal access network (PAN) connection. In another example, output device 148 is as a smart watch or a wireless headset. In an additional example, output device 148 is a head worn device such as smart glasses, a helmet mounted display (HMD), or visors that present a virtual reality (VR), extended reality (XR), or augmented reality (AR) service. In one or more embodiments, communication subsystem 202 communicates with one or more locally networked devices via a wireless local area network (WLAN) link provided by access node(s) 208. In one or more embodiments, access node(s) 208 supports communication using one or more IEEE 802.11 WLAN protocols. Access node(s) 208 is connected to a wide area network such as the Internet. In one or more embodiments, communication subsystem 202 communicates with GPS satellites 230 to obtain geospatial location information. In one or more embodiments, communication subsystem 202 communicates via network node(s) 204 or access node(s) 204 and external network 144 with external visual object library 150a.

Controller 102 communicates notification 147 to output device 148 for presenting to second person 149. In one or more embodiments, controller communicates with output device 148 via OTA connection 241 between communication subsystem 202 and output device 148. In one or more embodiments, controller communicates with output device 148 via cellular connection 242 between communication subsystem 202 and base node 204. In one or more embodiments, controller communicates with output device 148 via wireless connection 243 between communication subsystem 202 and access node 208. In one or more embodiments, controller communicates with output device 148 via wired connection 244 between network interface 122 and external network 144.

Figure 3:
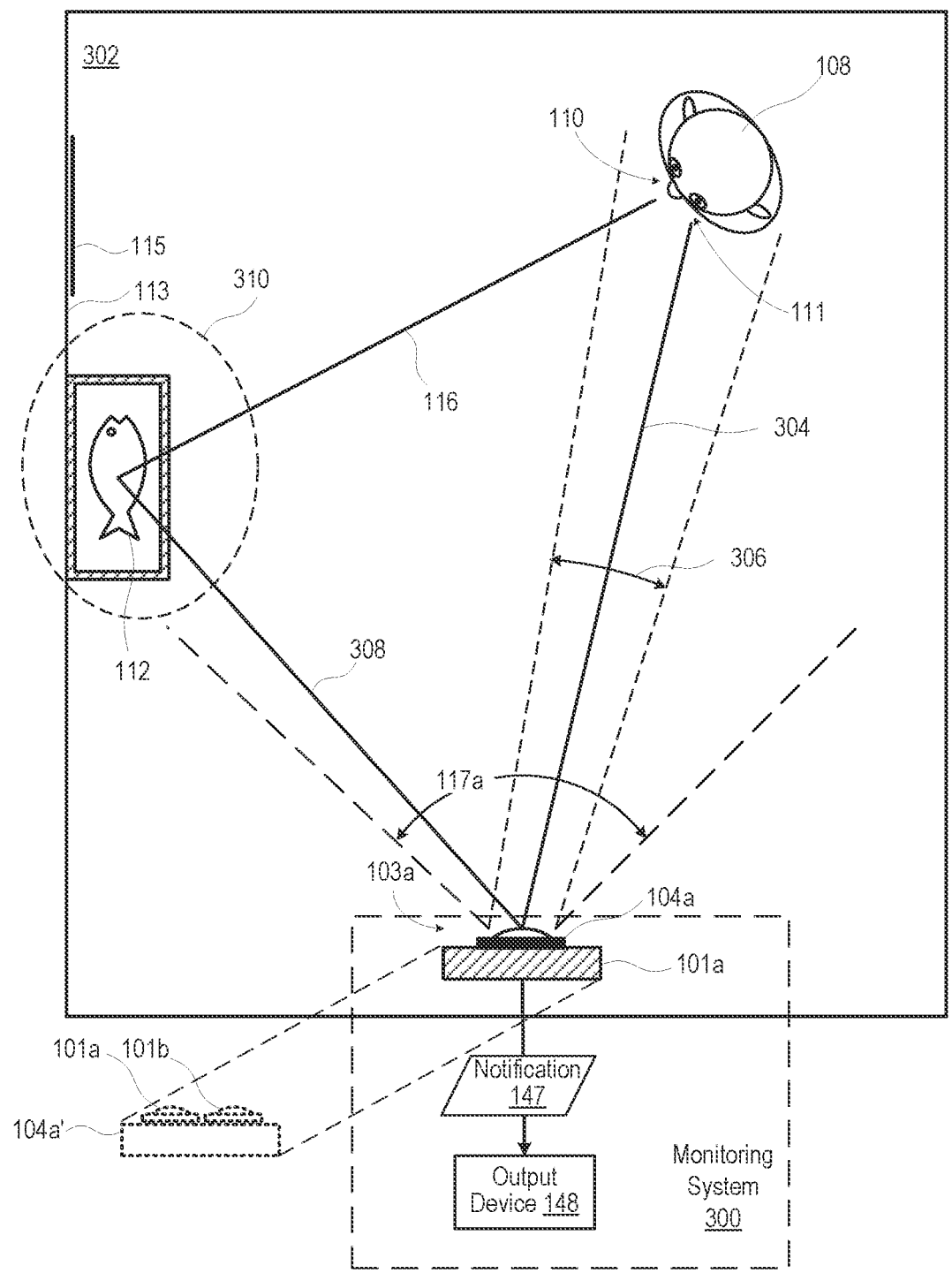
FIG. 3 is a top view diagram of a monitoring system provided by the electronic device of FIG. 1 or the communication device of FIG. 2 having a single camera system with one image capturing device (ICD) positioned to monitor a person and objects of interest to the person in a surrounding space viewable within the field of view of the single camera system, according to one or more embodiments.

FIG. 3 is a top view diagram of monitoring system 300 provided by single electronic device 101a having single camera system 103a with one ICD 104a positioned to monitor first person 108 in room 302. Monitoring system 300 includes output device 148 that is outside of room 302 and that receives notification 147. ICD 104a is positioned and controlled to have FOV 117a that simultaneously encompasses face 110 and eyes 111 of person 108 (first image stream 109a of FIG. 1) and also object 118 (second image stream 109b of FIG. 1) that is aligned with eye gaze direction 116 of person 108. For clarity, eye gaze direction 116 is depicted in two-dimension; however, electronic device 101a determines eye gaze direction 116 in three-dimensions based on determining location of first person 108 and orientation of face 110 and eyes 111 of first person 108 to ICD 104. Electronic device 101a determines direction 304 to first person 108 and distance to first person 108 to obtain location. Distance may be based on an apparent angular dimension 306 of first person 108 as viewed by ICD 104a using demographic scaling information for a person. Apparent size changes linearly with distance. Distance may be based on distance detection by distance measuring sensor 184 (FIG. 1). Electronic device 101 also determines direction 308 location of region of interest (ROI) 310 that is aligned with gaze direction 304. Within ROI 310, electronic device 101a identifies any objects 118 or object images 115 on surfaces 113. In one or more embodiments, first ICD 104a is gimballed to look sequentially at first person 108 and ROI 310.

In one or more embodiments, electronic device 110' includes two ICDs 104a-104b to respectively focus on first person 108 and ROI 310. Controller 102 determines ROI 310 by detecting vertical and horizontal angles of eyes 111 relative to the location of first ICD 104a and then mathematically extrapolating that information in a three-dimensional space (e.g., Cartesian or spherical coordinates) to an area in direct line of sight of eye gaze direction 116, before feeding that information into second camera controller of second ICD 104b to focus the lens on the area that is ROI 301—understanding that second ICD 104b is offset from first ICD 104a and from eyes 111 of first person 108, so the offset position has to be included in the determination of the true ROI.

Figure 4:
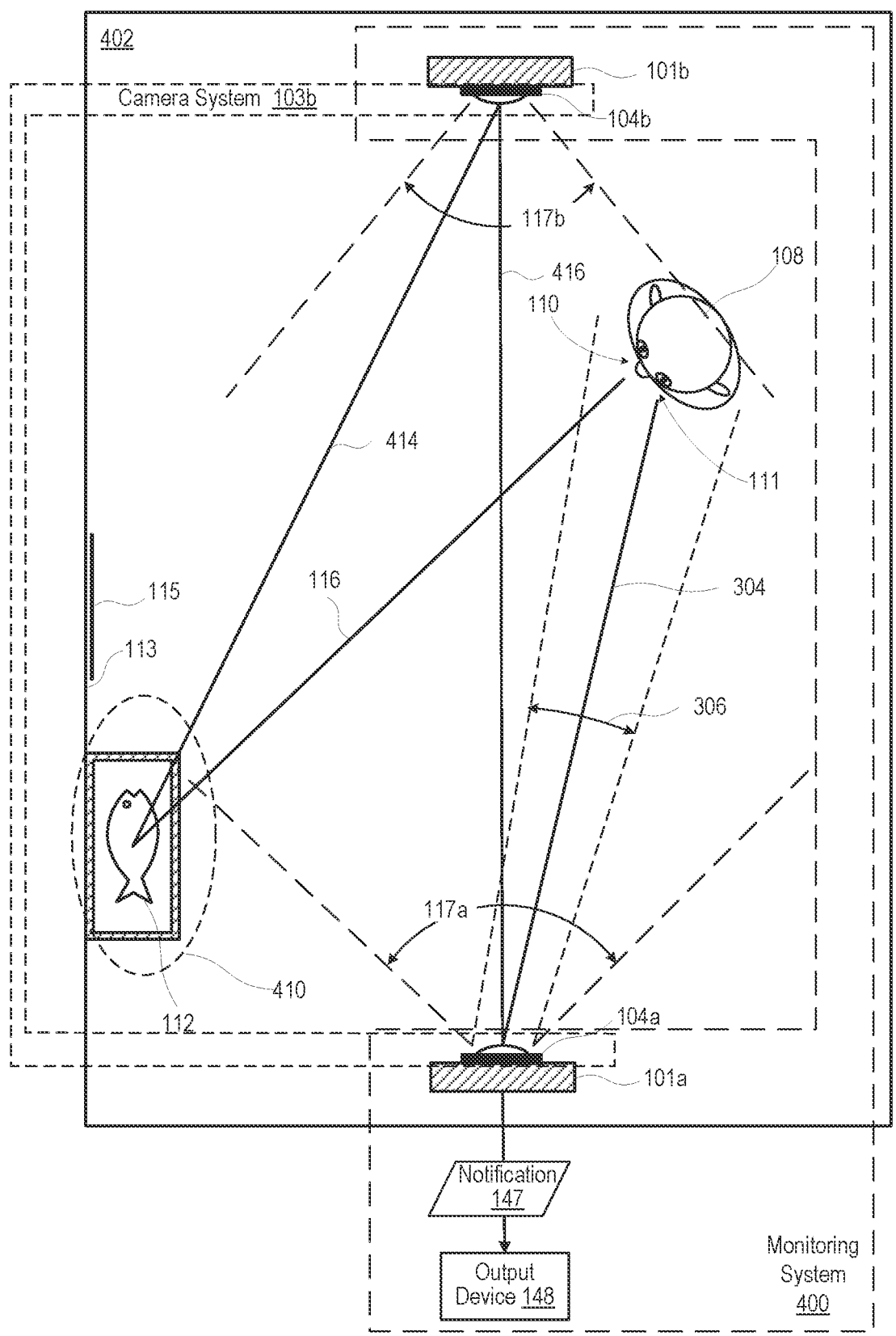
FIG. 4 is a top view diagram of a monitoring system provided by separate camera devices positioned to respectively monitor a person and objects in a surrounding space, according to one or more embodiments.

FIG. 4 is a top view diagram of monitoring system 400 having multi-camera system 103 provided in part by first electronic device 101a with first ICD 104a having FOV 117a positioned to monitor first person 108 in room 402. In particular, ICD 104a is positioned and controlled to have FOV 117 to encompasses face 110 and eyes 111 of person 108, which are presented within first image stream 109a of FIG. 1. Multi-camera system 103b is also provided in part by second electronic device 101b with second ICD 104b having FOV 117b positioned to monitor a space opposed to face of person and within which one or more objects 111 and/or object images can be found or positioned for viewing by person. The space can be in room 402, and objects and/or object images captured within FOV are presented within second image stream 109b of FIG. 1. Monitoring system 400 includes output device 148 that is located outside of room 402 and which receives and presents notification 147. Second electronic device 101b determines direction 414 and distance from second electronic device 101b to object 118. Object 118 in first ROI 310 is aligned with eye gaze direction 116 of person 108. For clarity, eye gaze direction 116 is depicted in two-dimension; however, first electronic device 101a determines eye gaze direction 116 is determined and extrapolated in three-dimensions as described above. In one embodiment, a relative direction 416 and distance between first and second electronic device 101a-101b and person 108 are determined in order to enable the correct extrapolation of eye gaze direction to a region of interest captured by second ICD of second electronic device 101b. In an example, communication signals between first and second electronic device 101a-101b provide indications of direction and distance of each device. In another example, optical analysis between first and second electronic device 101a-101b may be use by controlling processor of monitoring system 400 to determine relative direction and distance. With collaboration of direction and distance information between first and second electronic device 101a-101b and based on determining location of first person 108 and orientation of face 110 and eyes 111 of first person 108 to ICD 104, monitoring system 400 determines that eye gaze direction 116 monitored by electronic device 101a is aligned with a determined first ROI 410 that can be monitored by second electronic device 101b. According to one embodiment, electronic device 101 determines distance and direction 304 to first person 108, defining location of first person 108 relative to electronic device 101. Electronic device 101 also determines direction 308 to location of a region of interest (ROI) 310 that is aligned with gaze direction 304. Within ROI 308, electronic device 101 identifies any objects 118 or object images 115 on surfaces 113.

Figure 5:
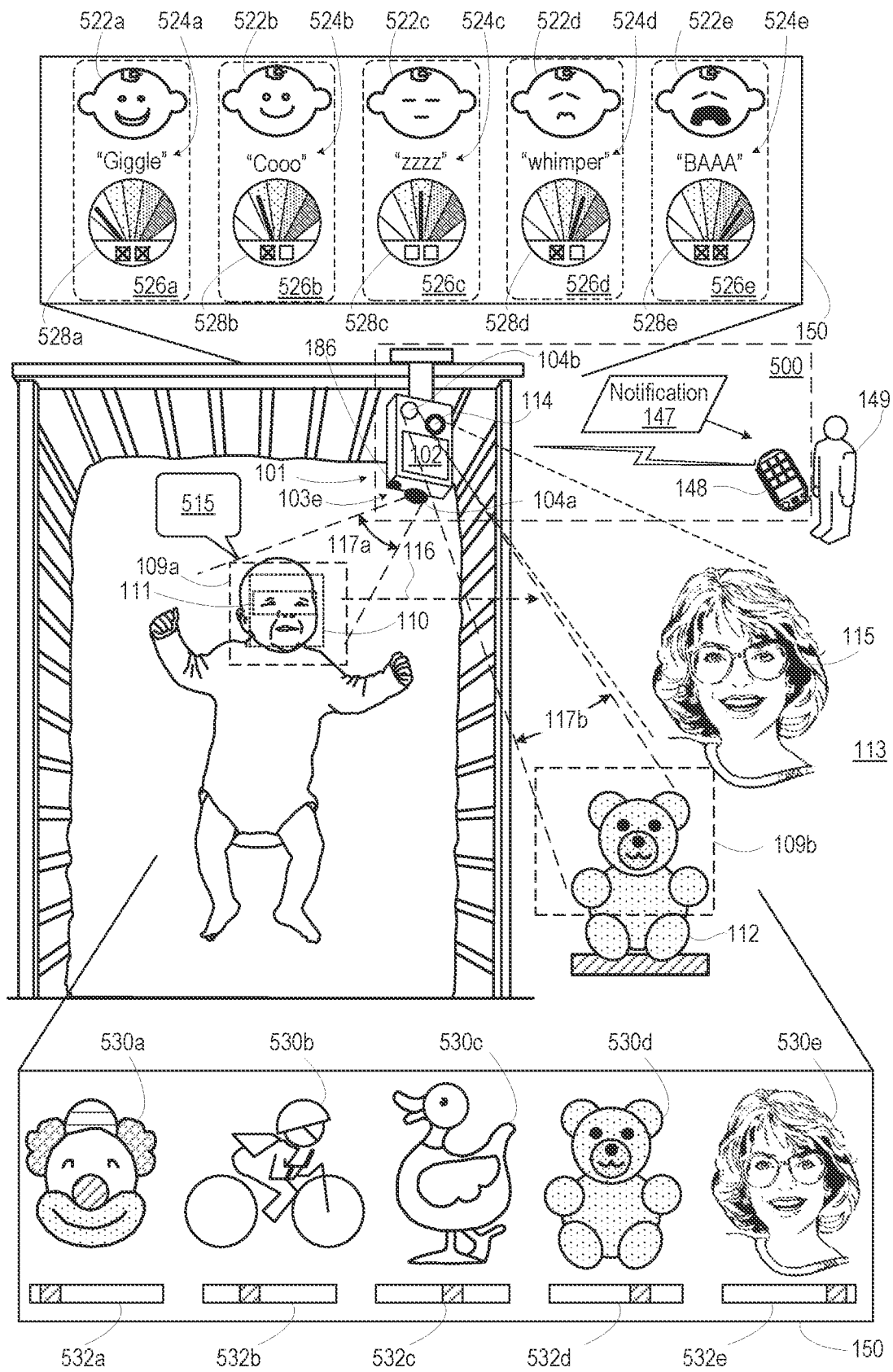
FIG. 5 is a top view of a monitoring system that performs image projection of content of subjective interest to a person responsive to a detected mood of the person, according to one or more embodiments.

FIG. 5 is a top view of monitoring system 500 provided by electronic device 101 monitoring first person 108. Monitoring system 500 provides image projection of content of subjective interest to first person 108 responsive to a detected mood of first person 108. Electronic device 101 includes multi-camera system 103e having integral first and second ICDs 104a-104b. First ICD 104a captures first image stream 109a that encompasses face 110 of first person 108 of interest. Electronic device 101 includes image projector 114. In one or more embodiments, image projector 114 is a separate device from electronic device 101 and is communicatively coupled to controller 102 of monitoring system 500. Electronic device 101 includes device memory 107 that stores: (i) a visual object library 150; and (ii) a preference tracking data structure 154. Controller 102 is communicatively coupled to device memory 107 and image projector 114. Controller 102 compares first image stream 109a with one or more facial expressions 522a-522e in visual object library 150.

In an example, first facial expression 522a is a happy expression. Second facial expression 522b is a contented expression. Third facial expression 522c is a neutral expression. Fourth facial expression 522d is a discontented expression. Fifth facial expression 522e is an unhappy expression. In one or more embodiments, sound files 524a-524e respectively correspond to facial expressions 522a-522e and may be used to corroborate or independently determine particular mood state 526a-526e of first person 108. First mood state 526a is happy. Second mood state 526b is contented. Third mood state 526c is neutral. Fourth mood state 526d is discontented. Fifth mood state 526e is unhappy. Each mood state 526a-526e may be designated as facial expression triggers 528a-528e for automated response(s). In one or more embodiments, each facial expression trigger 528a-528e may have one or more designated responses by electronic device 101. In an example, first facial expression 522a and/or first sound file 524a ("giggle") indicate first mood state 526a ("happy") that is designated first facial expression trigger 528a. First facial expression trigger 528a prompts a wider selection of projected object images 115, taking advantage of the good mood of first person 108 to explore responses to more image content.

In an example, visual object library 150 has five (5) stored object images 530a-530e each having corresponding level of interest 532a-532e, arranged from lowest level of interest 532a to highest level of interest 532e. First object image 530a is a clown with a "disliked" level of interest 532a. Second object image 530b is a cyclist with an "unfavorable" level of interest 532b. Third object image 530c is a duck with a "neutral" level of interest 532c. Fourth object image 530d is a teddy bear with a "favorable" level of interest 532d. Fifth object image 530e is a photo of mother with a "liked" level of interest 532e.

According to one embodiment, controller 102 determines one or more object images 530d-530e in visual object library 150 having an associated interest value (level of interest 532a-532e) in preference tracking data structure 154 (FIG. 1) above a threshold interest value corresponding to first person 108. For at least certain moods, controller 102 triggers image projector 114 to present one or more stored object images 530d-530e as object image 115 within a field of view of first person 108 to respond to corresponding facial expression triggers 528a-528e. In an example, facial expression trigger 528a enables presenting of all stored object images 530a-530e. First facial expression trigger 528a may also prompt a non-urgent notification 147 to output device 148 to second person 149 who may want to interact directly with first person 108 when happy. Second facial expression 522b and/or second sound file 524b ("coo") indicate second mood state 526b ("contented") that is designated second facial expression trigger 528b that prompts a narrower selection of stored object images 530b-530e. Third facial expression 522c and/or third sound file 524c ("zzz") indicate third mood state 526b ("neutral") that is designated third facial expression trigger 528c that may prompt discontinuing presentation of object image 115 on surface 113. Fourth facial expression 522d and/or fourth sound file 524d ("whimper") indicate fourth mood state 526d ("discontented") that is designated fourth facial expression trigger 528d that prompts yet a narrower selection of stored object images 530d-530e to soothe or placate first person 108. The ability to soothe or placate is premised on demonstrated level of interest in stored object images 530d-530e. Fourth facial expression trigger 528d may trigger a nonurgent notification 147 to output device 148 indicating the mood. Fifth facial expression 522e and/or fifth sound file 524e ("BAAA") indicate fifth mood state 526e ("unhappy") that is designated fifth facial expression trigger 528e that prompts yet a narrower selection of object images stored object images 530e to attempt to soothe or placate first person 108. Fifth facial expression trigger 528e triggers an urgent notification 147 to output device 148 indicating the mood.

In one or more embodiments, selection of object images 530a-530e may include presenting images that are unfamiliar to first person 108 to provide a greater novelty and ability to distract. In one or more embodiments, selection of object images 530a-530e may vary in categories or level of interest in attempt to learn what works in the current instance to improve the mood of first person 108. In one or more embodiments, selection of object images 530a-530e may closed loop feedback controls in moving away from categories of object images that do not entice first person 108 to look or that have a negative effect on mood and repeating additional images in the same category that have a positive effect.

In one or more embodiments, particular ones of facial expressions (e.g., first, second or third facial expressions 522a/522b/522c) and/or sound files (e.g., first, second or third sound file 524a/524b/524c) may not be designated as a trigger, allowing first person 108 in a happy/contented/neutral mood to be undisturbed.

In one or more embodiments, at least one microphone 186 of electronic device 101 is configured to detect audio input 515 from first person 108. Device memory 107 stores audio trigger data 159 (FIG. 1). Controller 102 compares audio input 515 from at least one microphone 186 to audio trigger data 159. In response to determining that audio input 515 includes at least one audio trigger among audio trigger data 159, controller 102 determines one or more stored object images 530d-530e in visual object library 150 having an associated interest value in preference tracking data structure 154 (FIG. 1) above the threshold interest value corresponding to first person 108. In one or more embodiments, a loud sound above the decibel threshold is presumed to be associated with a bad mood. In one or more embodiments, a loud sound above the decibel threshold may be further characterized to determine if the loud sound is not associated with a bad mood (e.g., talking or laughing).

Controller 102 triggers image projector to present one or more object images 530d-530e within the field of view of first person 108 to respond to the trigger. In one or more particular embodiments, the audio trigger includes relative decibel levels compared to one or more preset decibel levels. Controller 102 determines a decibel level of audio input 515. Controller 102 compares the decibel level to each of the one or more preset decibel levels. Controller 102 presents the one or more object images 530d-530e in response to the decibel level being above a first preset decibel level. In response to the decibel level being above a second preset decibel level, higher than the first preset decibel level, controller 102 communicates an urgent notification 147 to output device 148, which presents notification 147 to second person 149. As an example, notification 147 provides an indication that first person 108 is crying above the second preset decibel level.

In one or more embodiments, object images 530a-530e are a sequence of images or video images. In an example, a moving object such as a carousel is projected with different objects of interest being brought around to the front in succession. In one or more embodiments, object images 530a-530e are images of patterns and designs. In one or more embodiments, object images 530a-530e are accompanied by audio outputs such as tones, music, voices, or ambient soothing sounds, such as the ocean or rain. In one or more embodiments, object images 530a-530e are a coordinated compilation of a video of a parent reading a book including a face and voice of the parent, which may be accompanied by an image of each page being read.

In one or more embodiments, controller 102 triggers image projector 114 to present one or more object images 530d-530e to respond to the trigger for a predefined period of time. Controller 102 monitors a time period during which first person 108 continues to emit audio input 515 above a first preset decibel level. In response to the time period extending beyond the predefined period of time, controller 102 communicates notification 147 to output device 148, which presents notification 147 to second person 149. Notification 147 includes an indication that first person 108 is crying at the first level for the predefined period of time.

In one or more embodiments, electronic device 101 includes multi-camera system 103e having first ICD 104a with first FOV 117a that captures first image stream 109a encompassing eyes 111 of first person 108. Multi-camera system 103e includes second ICD 104b with second FOV 117b that captures second image stream 109b that at least partially encompasses one or more surrounding tangible objects 112 and surfaces 113 viewable by first person 108. Controller 102 triggers EGD application 128 stored in device memory 107 (FIG. 1) to determine eye gaze direction 116 of first person 108. Controller 102 determines a first region of interest (ROI) among the one or more surrounding tangible objects 112 and surfaces 113 that is aligned with eye gaze direction 116. Controller 102 identifies first object 112 contained within the first ROI. Controller 102 determines an interest value of first object 112 to first person 108, in part based on a length of time first person 108 gazes at first object 112. Controller 102 stores the interest value along with identifying data of identified first object 112 in preference tracking data structure 154 (FIG. 1). Controller 102 associates a characteristic of first object 112 with a mood of first person 108 based on one or more of the facial expression of first person 108 and audio input 515 from first person 108. Controller 102 assigns an interest value to first object 112 based on the mood. In one or more particular embodiments, controller 102 increases the interest value associated with first object 112 in response to determining that audio input 515 matches a happy sound. In one or more particular embodiments, controller 102 increases the interest value associated with first object 112 in response to determining that first person 108 has a happy facial expression. In one or more particular embodiments, controller 102 decreases the interest value associated with first object 112 in response to determining that first person 108 has an unhappy facial expression. In one or more particular embodiments, controller 102 decreases the interest value associated with first object 112 in response to determining that audio input 515 matches an unhappy sound.

Figure 6:
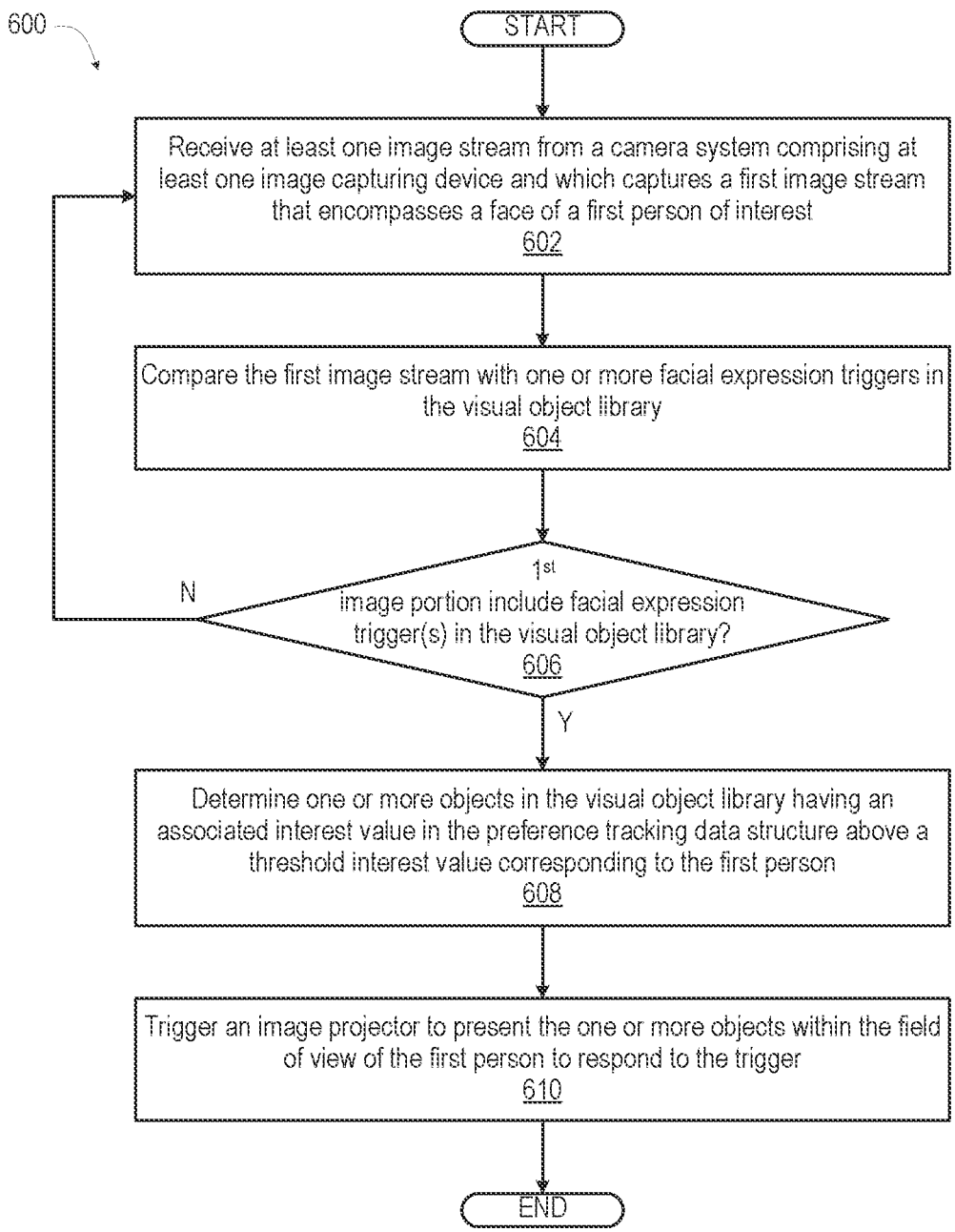
FIG. 6 presents a flow diagram of a method performed by the monitoring system of FIG. 11 for image projection of content of subjective interest to a person responsive to a detected mood of the person based on facial expression, according to one or more embodiments.
Figure 7A:
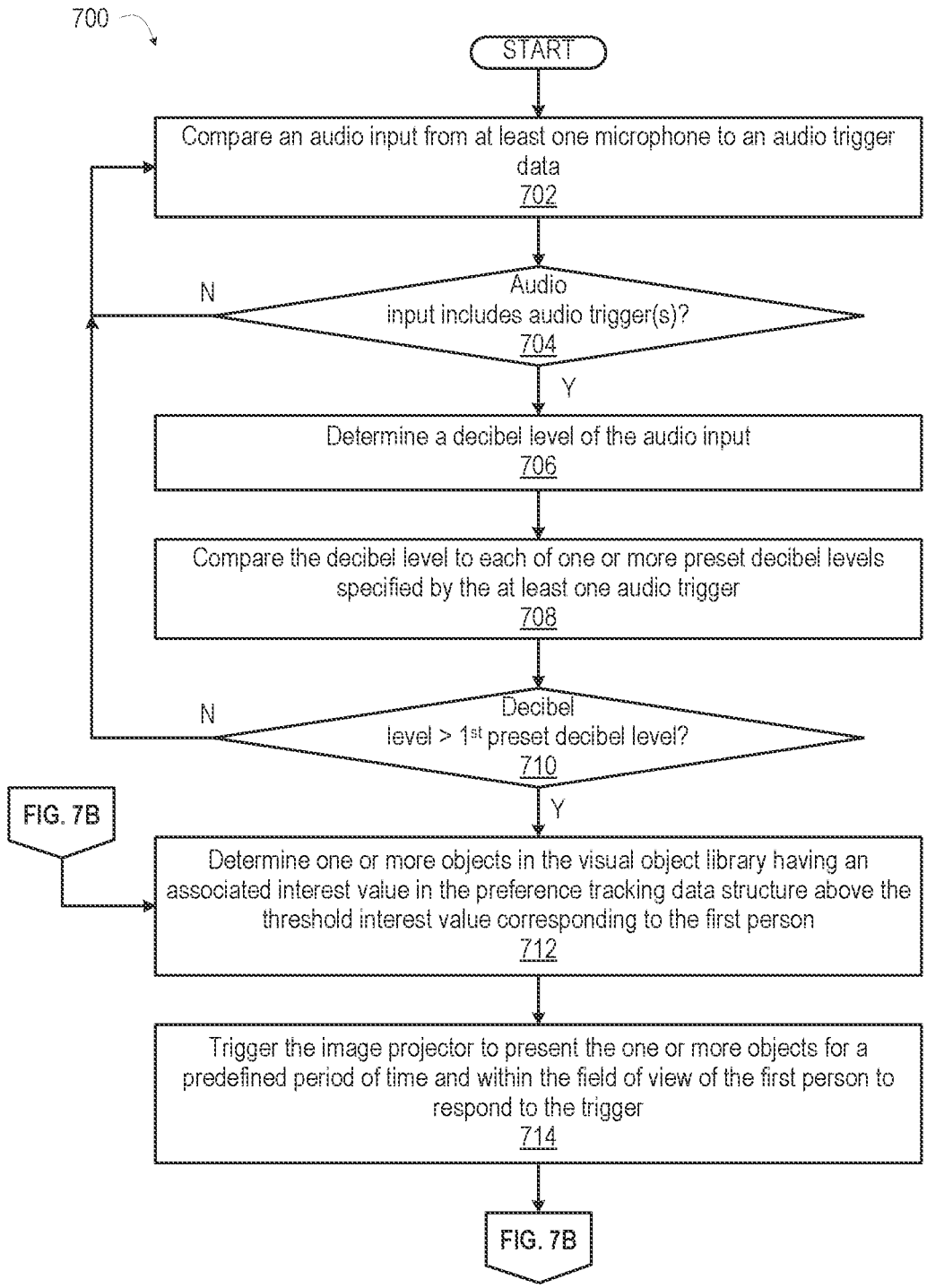
FIGS. 7A-7B (collectively "FIG. 7") present a flow diagram of a method of enhancing or augmenting features of the method of FIG. 6 for image projection to include notification of a second person further in response to audio cues of the mood of the first person, according to one or more embodiments.
Figure 7B:
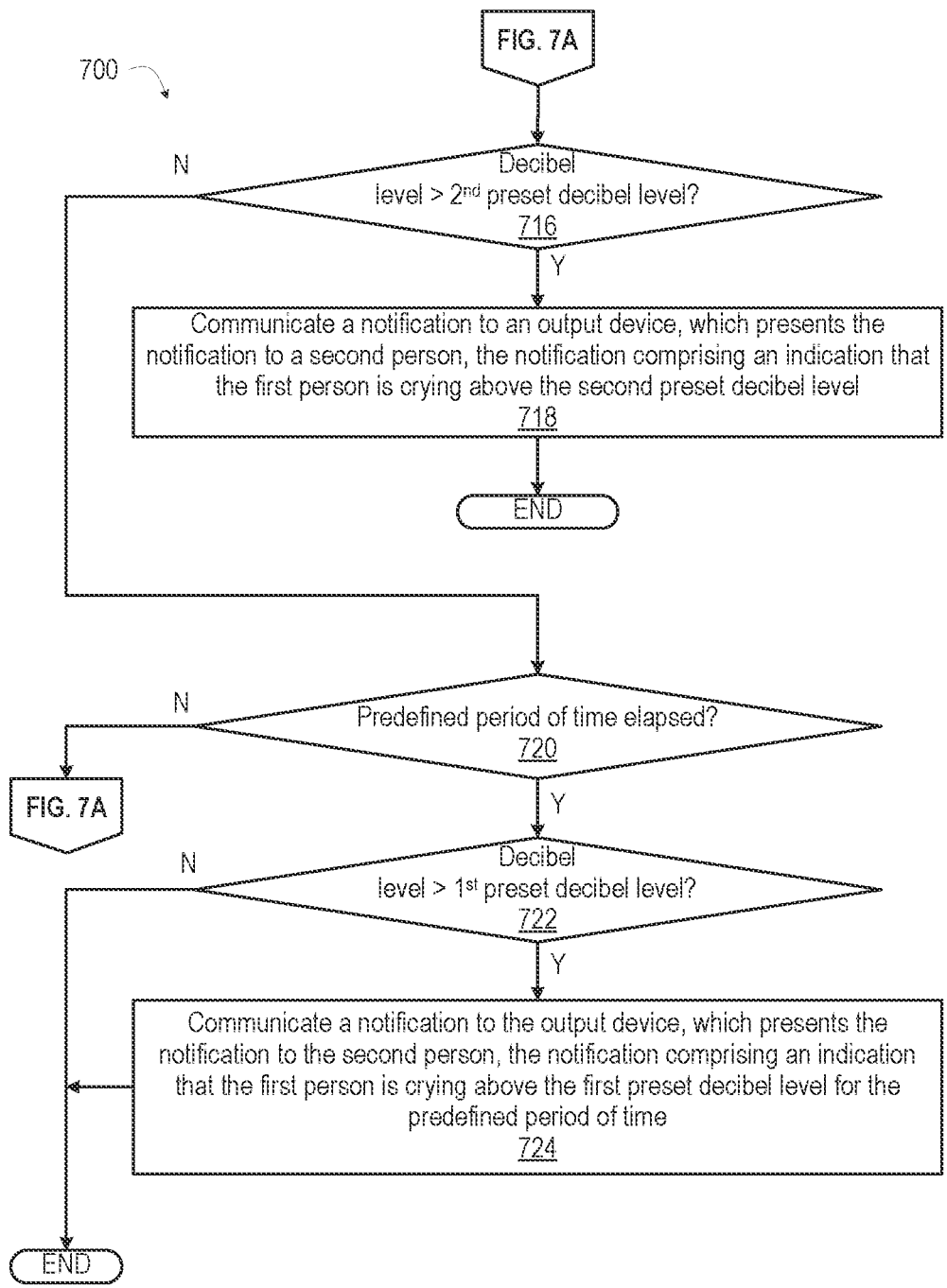
Figure 8:
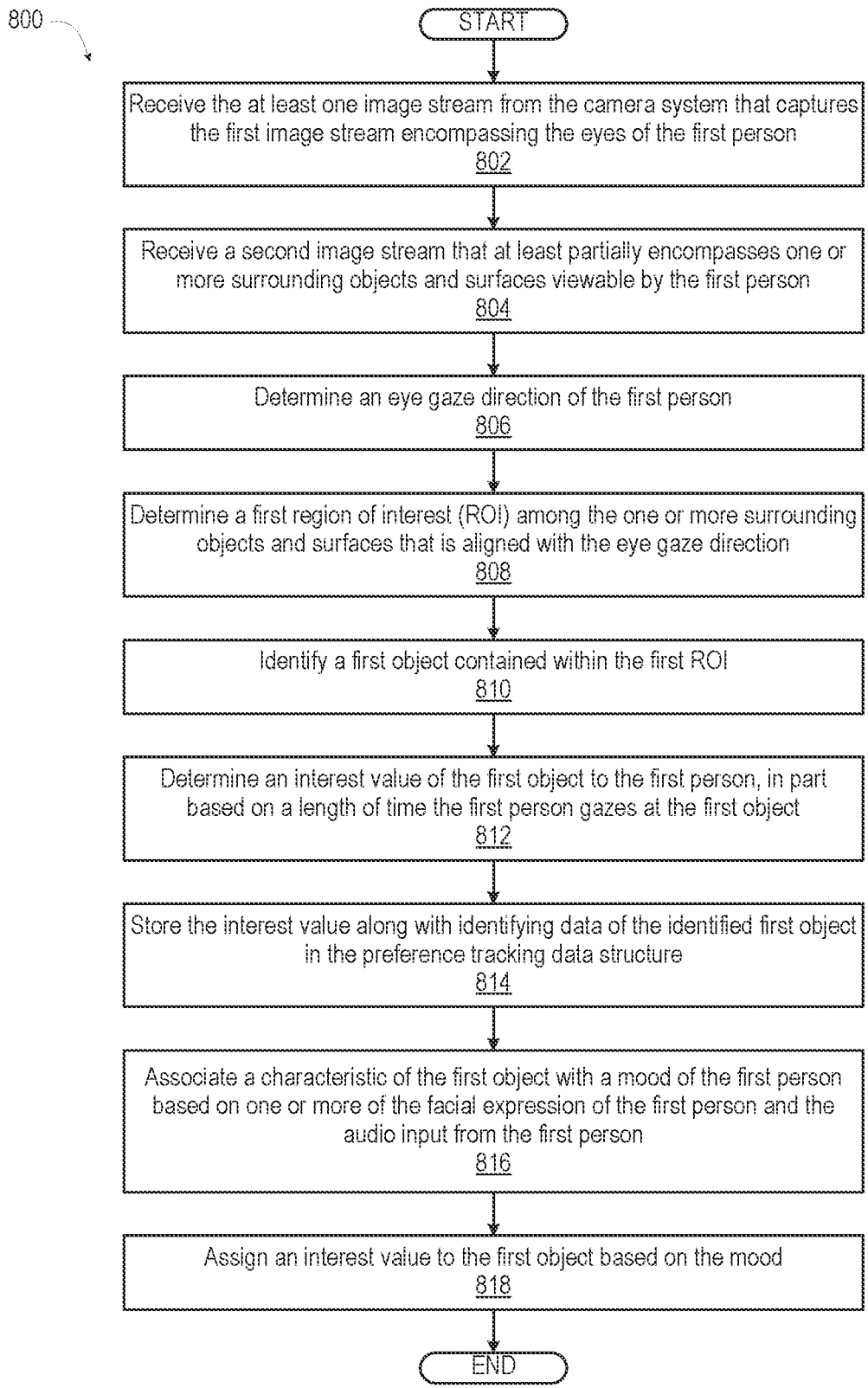
FIG. 8 presents a flow diagram of a method of enhancing or augmenting features of the method of FIG. 6 for image projection based on prior learning of an interest value of objects gazed upon by first person, according to one or more embodiments.

FIG. 6 presents a flow diagram of method 600 performed by electronic device 101 (FIG. 1) or communication device 200 (FIG. 2) for image projection of content of subjective interest to a person responsive to a detected mood of the person. FIGS. 7A-7B (collectively "FIG. 7") present a flow diagram of method 700 of enhancing or augmenting features for image projection to include notification of a second person in response to audio cues of the mood of the first person. FIG. 8 presents a flow diagram of method 800 of enhancing or augmenting features for image projection based on prior learning of an interest value of objects gazed upon by first person. The descriptions of methods 600 (FIG. 6), method 700 (FIGS. 7A-7B) and method 800 (FIG. 8) are provided with general reference to the specific components illustrated within the preceding FIGS. 1-5 and specific components referenced in methods 600 (FIG. 6), method 700 (FIGS. 7A-7B) and method 800 (FIG. 8) may be identical or similar to components of the same name used in describing preceding FIGS. 1-5. In one or more embodiments, controller 102 (FIGS. 1-2) of monitoring system configures electronic device 101 (FIG. 1) or communication device (FIG. 2) to provide functionality of methods 600 (FIG. 6), method 700 (FIGS. 7A-7B) and method 800 (FIG. 8).

With reference to FIG. 6, method 600 includes receiving at least one image stream from a camera system comprising at least one image capturing device and which captures a first image stream that encompasses a face of a first person of interest (block 602). Method 600 includes comparing the first image stream with one or more facial expression triggers in the visual object library (block 604). Method 600 includes determining whether the first image stream includes a facial expression of the person that is at least one facial expression trigger among the visual object library (decision block 606). In response to determining that the first image stream does not include a facial expression of the person that is at least one facial expression trigger among the visual object library, method 600 returns to block 602. In response to determining that the first image stream includes the facial expression that is at least one facial expression trigger among the visual object library, method 600 includes determining one or more objects in the visual object library having an associated interest value in the preference tracking data structure above a threshold interest value corresponding to the first person (block 608). Method 600 includes triggering an image projector to present the one or more objects within the field of view of the first person to respond to the trigger (block 610). Then method 600 ends.

With reference to FIG. 7A, method 700 includes comparing an audio input from at least one microphone to an audio trigger data (block 702). Method 700 includes determining whether the audio input includes at least one audio trigger among the audio trigger data (decision block 704). In response to determining that the audio input does not include at least one audio trigger among the audio trigger data, method 700 returns to block 702. In response to determining that the audio input does include at least one audio trigger among the audio trigger data, method 700 includes determining a decibel level of the audio input (block 706). Method 700 includes comparing the decibel level to each of one or more preset decibel levels specified by the at least one audio trigger (block 708). Method 700 includes determining whether the decibel level is above a first preset decibel level (decision block 710). In response to determining that the first decibel level is not above (i.e., less than or equal to) the first preset decibel level, method 700 returns to block 702. In response to determining that the first decibel level is above the first preset decibel level, method 700 includes determining one or more objects in the visual object library having an associated interest value in the preference tracking data structure above the threshold interest value corresponding to the first person (block 712).

In one or more alternate embodiments, preset decibel levels are not specified, so the above steps in block 710-712 are not performed. Method 700 includes triggering the image projector to present the one or more objects within the field of view of the first person for a predefined period of time in order to respond to the trigger (block 714). Then method 700 proceeds to FIG. 7B.

With reference to FIG. 7B, method 700 includes determining whether the decibel level is above a second preset decibel level, higher than the first preset decibel level (decision block 716). In response to determining that the decibel level is above the second preset decibel level, method 700 includes communicating a notification to an output device, which presents the notification to a second person (block 718). The notification includes an indication that the first person is crying above the second preset decibel level. Then method 700 ends. In response to determining that the decibel level is not above (i.e., less than or equal to) the second preset decibel level, method 700 includes determining whether the predefined period of time has elapsed (decision block 720). In response to determining that the predefined period of time has not elapsed, method 700 returns to block 712 (FIG. 7A). In response to determining that the predefined period of time has elapsed, method 700 includes determining whether the decibel level continues to be above the first preset decibel level (decision block 722). In response to determining that the decibel level is not above (i.e., less than or equal to) the first preset decibel level, method 700 ends. In response to determining that the decibel level is above the first preset decibel level, method 700 includes communicating to the output device, a notification including an indication that the first person is crying above the first preset decibel level for the predefined period of time, where the output device presents the notification to the second person (block 724). Then method 700 ends.

With reference to FIG. 8, method 800 includes receiving the at least one image stream from the camera system that captures the first image stream encompassing the eyes of the first person (block 802). Method 800 includes receiving a second image stream that at least partially encompasses one or more surrounding objects and surfaces viewable by the first person (block 804). Method 800 includes determining an eye gaze direction of the first person (block 806). Method 800 includes determining a first region of interest (ROI) among the one or more surrounding objects and surfaces that is aligned with the eye gaze direction (block 808). Method 800 includes identifying a first object contained within the first ROI (block 810). Method 800 includes determining an interest value of the first object to the first person, in part based on a length of time the first person gazes at the first object (block 812). Method 800 includes storing the interest value along with identifying data of the identified first object in the preference tracking data structure (block 814). Method 800 includes associating a characteristic of the first object with a mood of the first person based on one or more of the facial expression of the first person and the audio input from the first person (block 816). Method 800 includes assigning an interest value to the first object based on the mood (block 818). Then method 800 ends.

In one or more embodiments, method 800 includes increasing the interest value associated with the first object in response to determining that the audio input matches a happy sound. In one or more embodiments, method 800 includes increasing the interest value associated with the first object in response to determining that first person has a happy facial expression. In one or more embodiments, method 800 includes decreasing the interest value associated with the first object in response to determining that first person has an unhappy facial expression. In one or more embodiments, method 800 includes decreasing the interest value associated with the first object in response to determining that the audio input matches an unhappy sound.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation is not limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A monitoring system comprising:
    a camera system comprising at least one image capturing device and which captures a first image stream that encompasses a face of a first person of interest;
    an image projector;
    a memory that stores: (i) a visual object library; and (ii) a preference tracking data structure; and
    a controller communicatively coupled to the camera system, the image projector and the memory, and which:
        compares facial expressions within the first image stream with one or more facial expression triggers in the visual object library; and in response to determining that the first image stream comprises at least one facial expression that is pre-established as a facial expression trigger within the visual object library:
  determines one or more objects in the visual object library having an interest value in the preference tracking data structure above a threshold interest value corresponding to the first person; and
  triggers the image projector to present the one or more objects within a field of view of the first person to respond to the at least one facial expression.

2. The monitoring system of claim 1, further comprising at least one microphone configured to detect audio input from the first person, wherein:
the memory stores audio trigger data; and
the controller:
  compares the audio input from the at least one microphone to the audio trigger data; and
  in response to determining that the audio input comprises at least one audio trigger among the audio trigger data:
    determines one or more objects in the visual object library having an associated interest value in the preference tracking data structure above the threshold interest value corresponding to the first person; and
    triggers the image projector to present the one or more objects within the field of view of the first person to respond to the at least one audio trigger.

3. The monitoring system of claim 2, wherein the audio trigger comprises relative decibel levels compared to one or more preset decibel levels, and the controller:
  determines a decibel level of the audio input;
  compares the decibel level to each of the one or more preset decibel levels;
  presents the one or more objects in response to the decibel level being above a first preset decibel level; and
  in response to the decibel level being above a second preset decibel level, higher than the first preset decibel level, communicates a notification to an output device, which presents the notification to a second person, the notification comprising an indication that the first person is crying above the second preset decibel level.

4. The monitoring system of claim 2, wherein the controller:
  triggers the image projector to present the one or more objects to respond to the trigger for a predefined period of time;
  monitors a time period during which the first person continues to emit the audio input above a first preset decibel level; and
  in response to the time period extending beyond the predefined period of time, communicates a notification to an output device, which presents the notification to a second person, the notification comprising an indication that the first person is crying at the first level for the predefined period of time.

5. The monitoring system of claim 2, wherein:
the camera system captures the first image stream encompassing eyes of the first person and a second image stream that at least partially encompasses one or more surrounding objects and surfaces viewable by the first person;
the memory stores an eye gaze detection (EGD) application; and
the controller:
  triggers the EGD application to determine an eye gaze direction of the first person;
  determines a first region of interest (ROI) among the one or more surrounding objects and surfaces that is aligned with the eye gaze direction;
  identifies a first object contained within the first ROI;
  determines an interest value of the first object to the first person, in part based on a length of time the first person gazes at the first object;
  stores the interest value along with identifying data of the identified first object in the preference tracking data structure;
  associates a characteristic of the first object with a mood of the first person based on one or more of the facial expression of the first person and the audio input from the first person; and
  assigns a soothing value to the first object based on the mood.

6. The monitoring system of claim 5, wherein the controller increases the soothing value associated with the first object in response to determining that the audio input matches a happy sound.

7. The monitoring system of claim 5, wherein the controller increases the soothing value associated with the first object in response to determining that first person has a happy facial expression.

8. The monitoring system of claim 5, wherein the controller decreases the soothing value associated with the first object in response to determining that first person has an unhappy facial expression.

9. The monitoring system of claim 5, wherein the controller decreases the soothing value associated with the first object in response to determining that the audio input matches an unhappy sound.

10. A method comprising:
receiving at least one image stream from a camera system comprising at least one image capturing device and which captures a first image stream that encompasses a face of a first person of interest;
comparing facial expressions within the first image stream with one or more facial expression triggers in a visual object library; and
in response to determining that the first image stream comprises at least one facial expression trigger among the visual object library:
  determining one or more objects in the visual object library having an associated interest value in a preference tracking data structure above a threshold soothing value corresponding to the first person; and
  triggering an image projector to present the one or more objects within a field of view of the first person to respond to the at least one facial expression.

11. The method of claim 10, further comprising:
comparing an audio input from at least one microphone to an audio trigger data; and
in response to determining that the audio input comprises at least one audio trigger among the audio trigger data:
  determining one or more objects in the visual object library having an associated interest value in the preference tracking data structure above the threshold soothing value corresponding to the first person; and
  triggering the image projector to present the one or more objects within the field of view of the first person to respond to the at least one audio trigger.

12. The method of claim 11, wherein the audio trigger comprises relative decibel levels compared to one or more preset decibel levels, and the method further comprises:
- determining a decibel level of the audio input;
- comparing the decibel level to each of the one or more preset decibel levels;
- presenting the one or more objects in response to the decibel level being above a first preset decibel level; and
- in response to the decibel level being above a second preset decibel level, higher than the first preset decibel level, communicating a notification to an output device, which presents the notification to a second person, the notification comprising an indication that the first person is crying above the second preset decibel level.

13. The method of claim 11, further comprising:
- triggering the image projector to present the one or more objects to respond to the trigger for a predefined period of time;
- monitoring a time period during which the first person continues to emit the audio input above a first preset decibel level; and
- in response to the time period extending beyond the predefined period of time, communicating a notification to an output device, which presents the notification to a second person, the notification comprising an indication that the first person is crying at the first level for the predefined period of time.

14. The method of claim 11, further comprising receiving the at least one image stream from the camera system that captures the first image stream encompassing eyes of the first person and a second image stream that at least partially encompasses one or more surrounding objects and surfaces viewable by the first person;
- determining an eye gaze direction of the first person;
- determining a first region of interest (ROI) among the one or more surrounding objects and surfaces that is aligned with the eye gaze direction;
- identifying a first object contained within the first ROI;
- determining an interest value of the first object to the first person, in part based on a length of time the first person gazes at the first object;
- storing the interest value along with identifying data of the identified first object in the preference tracking data structure;
- associating a characteristic of the first object with a mood of the first person based on one or more of the facial expression of the first person and the audio input from the first person; and
- assigning a soothing value to the first object based on the mood.

15. The method of claim 14, further comprising increasing the soothing value associated with the first object in response to determining that the audio input matches a happy sound.

16. The method of claim 14, further comprising increasing the soothing value associated with the first object in response to determining that first person has a happy facial expression.

17. The method of claim 14, further comprising decreasing the soothing value associated with the first object in response to determining that first person has an unhappy facial expression.

18. The method of claim 14, further comprising decreasing the soothing value associated with the first object in response to determining that the audio input matches an unhappy sound.

19. A computer program product comprising:
- a computer readable storage device; and
- program code on the computer readable storage device that when executed by a processor associated with a monitoring system, the program code enables the monitoring system to provide functionality of:
  - receiving at least one image stream from a camera system comprising at least one image capturing device and which captures a first image stream that encompasses a face of a first person of interest;
  - comparing facial expressions within the first image stream with one or more facial expression triggers in a visual object library; and
  - in response to determining that the first image stream comprises at least one facial expression trigger among the visual object library:
    - determining one or more objects in the visual object library having an associated interest value in a preference tracking data structure above a threshold soothing value corresponding to the first person; and
    - triggering an image projector to present the one or more objects within a field of view of the first person to respond to the at least one facial expression.

20. The computer program product of claim 19, wherein the program code enables the monitoring system to provide the functionality of:
- comparing an audio input from at least one microphone to an audio trigger data; and
- in response to determining that the audio input comprises at least one audio trigger among the audio trigger data:
  - determining one or more objects in the visual object library having an associated interest value in the preference tracking data structure above the threshold soothing value corresponding to the first person; and
  - triggering the image projector to present the one or more objects within the field of view of the first person to respond to the at least one audio trigger.

* * * * *